March 12, 1940.  E. X. SCHMIDT  2,193,240
METHOD OF AND APPARATUS FOR CONTROLLING MIXING OF COMBUSTIBLE GASES
Filed Oct. 25, 1937  3 Sheets-Sheet 1

Fig. 1

Inventor
Edwin X. Schmidt
By Frank H. Hubbard
Attorney

March 12, 1940.  E. X. SCHMIDT  2,193,240
METHOD OF AND APPARATUS FOR CONTROLLING MIXING OF COMBUSTIBLE GASES
Filed Oct. 25, 1937  3 Sheets-Sheet 2

Fig. 2

Inventor
Edwin X. Schmidt
By Frank H. Hubbard
Attorney

March 12, 1940.   E. X. SCHMIDT   2,193,240
METHOD OF AND APPARATUS FOR CONTROLLING MIXING OF COMBUSTIBLE GASES
Filed Oct. 25, 1937   3 Sheets-Sheet 3

Patented Mar. 12, 1940

2,193,240

UNITED STATES PATENT OFFICE 2,193,240

METHOD OF AND APPARATUS FOR CONTROLLING MIXING OF COMBUSTIBLE GASES

Edwin X. Schmidt, Whitefish Bay, Wis., assignor to Cutler-Hammer, Inc., Milwaukee, Wis., a corporation of Delaware Application October 25, 1937, Serial No. 170,909

19 Claims. (Cl. 48—180)

This invention relates to improvements in methods of and apparatus for controlling mixing of combustible gases.

In most gas mixing installations it is desirable to maintain a constant total heating value per unit volume of the mixed gas; but there are certain exceptional cases where, due to the method of or means for utilizing the mixed gas it is desirable to vary the total heating value per unit volume of the mixed gas in accordance with and to compensate for variations in physical and/or chemical properties of one or more of the component or constituent gases of the mixture. Even in these exceptional cases it is practically always desirable to control the gas mixing primarily as a function of the total heating value per unit volume of the mixed gas, but to vary the total heating value per unit volume of the mixed gas maintained by the primary means as a secondary function of variations in some other property of one or more of the component gases,—which variations might affect the rate of flow of the mixed gas in gas burning equipment or the combustion characteristics of the mixed gas.

Here assume that two or more gases are being mixed for general distribution in a community or to a number of gas consumers where the fuel is purchased on the basis of a constant total heating value per cubic foot of mixed gas. In such a case mixing to provide a constant total heating value per unit volume of the mixed gas is the only justifiable and equitable method of control. If the specific gravity of the mixed gas does not vary more than twenty per cent above or ten per cent below a predetermined mean value; and if other combustion characteristics (velocity of flame propagation, air requirements for complete combustion, flame temperature, impurities, etc.) of the mixed gas do not vary over a wide range, such mixing to provide a constant total heating value per unit volume of the mixture will provide a fuel entirely suitable for most combustion processes.

On the other hand, let it be assumed that the gaseous fuel mixture is used in an industrial process wherein control of the furnace atmosphere is of great importance. In view of the fact that the composition of the gaseous fuel mixture is inherently variable and may vary over relatively wide limits in such a manner as to affect either the rate of flow through flow control devices, the amount of air required for the liberation of a fixed or constant amount of heat per unit of time, the flame temperature, or the rate of combustion, etc.; it is obvious that for this particular type of gas mixing installation maintenance of a constant total heating value per unit volume of the mixture is not necessary, and in fact may be objectionable.

As aforestated, however, it is desirable to control mixing primarily as a function of total heating value per unit volume of the mixture and to vary the total heating value per unit volume initially selected to be maintained, in accordance with and to compensate for variations in those properties of the gaseous mixture which are of secondary importance in the most efficient use of such mixture. Such variations in the properties of the gaseous mixture (other than variations in the total heating value per unit volume thereof) are incident not only to variations in the chemical and physical behavior of the mixed gas, but also depend upon the type of gas burner used, the metering control of the air and gas, the type of heating process involved, etc.

The method of mixing herein contemplated requires such proportioning of the combustible fluid constituents (say, undiluted rich gas and air) as will result in a mixture whose flow factor (which equals unity divided by the square root of the specific gravity) decreases or increases in value upon an increase or decrease, respectively, in the total heating value per unit volume of the mixture.

Thus it may be assumed that the mixed gas (comprising an undiluted rich gas of the paraffin or olefin series, and air) is to be used in an annealing furnace, the atmosphere of which must be maintained on the reducing side. The heat input rate to the furnace should be maintained substantially constant. The flows of undiluted rich gas and combustion air are normally maintained volumetrically proportional to each other by maintaining constantly proportional pressure drops across constrictions through which the respective flows are required to pass. For practical reasons air will be used with the undiluted rich gas to provide a gaseous mixture having more suitable characteristics than the incoming undiluted rich gas itself.

Maintenance of the furnace heat and control of furnace atmosphere are in this case of primary importance. As a matter of fact, control of the furnace atmosphere is of greater importance than control of the furnace heat. Because of the fact that the amount of heat liberated per cubic foot of air consumed in combustion of the undiluted rich gas is substantially constant, regardless of the composition of the undiluted rich gas, maintenance of a volumetrically constant input of air and supply of the undiluted rich gas at a volumetric rate slightly in excess of that required for complete combustion of the air, will not only insure the desired atmosphere, but will also insure maintenance of the desired degree of heat in the furnace, requiring only occasional slight changes in the volumetric proportionality of the flows of air and undiluted rich gas.

Neglecting for the instant, the fact that the quantity of air required per B. t. u. of heat liberated by combustion varies with the composition of the incoming mixed gas and the further fact that the air added to the undiluted rich gas decreases the amount of additional air required for combustion; and assuming control of the mixing so that the total heating value per unit volume of the mixed gas divided by the square root of the mixed gas specific gravity is equal to a constant, then the gas flow regulating means would provide a constant heat input to the burners regardless of variations in the heating value and the specific gravity of the undiluted rich gas, and the desired furnace atmosphere would be maintained. In other words, since the total heating value per unit volume of the mixed gas would change in the opposite direction from the change in the volumetric rate of flow, and to a corresponding degree, the heat input would remain constant. However, since the amount of air required per B. t. u. of liberated heat varies, and inasmuch as part of the air required for combustion is contained in the mixed gas, a further change in the relation of the total heating value per unit volume of the mixed gas and the square root of the specific gravity thereof is desirable in order to maintain the proper furnace atmosphere.

It is a characteristic of paraffin or olefin series gases and natural gas, or a mixture of such gases, that a quite definite relationship exists between the total heating value per unit volume, the specific gravity thereof and the quantity of air required per B. t. u. of heat liberated therefrom. The relationship between such total heating value per unit volume and specific gravity of such a gas is approximated by the equation: Total heating value per unit volume $=(1500)$ (specific gravity) $+150$.

A similar relationship exists between the specific gravity of a mixture of such gases with air and the total heating value per unit volume of such a mixture; and in a mixing control in which proportioned restrictions are employed for proportioning the air and gas, the proportioning means provides an indication of the proportions of air and gas (when mixing to a heating value coordinated with respect to the setting of the proportioning means) and further provides an indication of the specific gravity of the mixture.

An object of the invention is to provide for mixing of a plurality of combustible fluids in a manner to insure a substantially constant effect of combustion of the mixture.

Another object of the invention is to provide novel methods of and apparatus for stabilizing and undiluted rich gas, the chemical and/or physical properties of which are variable, by effecting admixture therewith of the proper proportionality of air or other gas the chemical and/or physical properties of which remain substantially constant.

Another object is to insure production of a gaseous mixture, including undiluted rich gas and a diluent gas or gases, a combustion effect of which is maintained substantially constant, regardless of variations in the composition of said undiluted rich gas.

Another object is to provide methods of and apparatus for producing a combustible gaseous mixture wherein a predetermined relationship is maintained between the total heating value per unit volume and the specific gravity thereof.

Another and more specific object is to so control the admixture of a plurality of constituent combustible fluids as to provide for the mixture a flow factor (unity divided by the square root of the specific gravity) which decreases or increases in accordance with and as a function of increases or decreases, respectively, in the total heating value per unit volume of such mixture.

Another object is to provide for primary control of the admixture of an undiluted rich gas and a diluent gas or gases in accordance with and to compensate for variations in the total heating value per unit volume of the mixture, and to provide for modification of said primary control in a manner to insure a substantially constant effect of combustion of such mixture.

Another object is to provide for control of the admixture of an undiluted rich gas and a diluent gas or gases in such manner as to permit substitution for the resulting gaseous mixture of another gas or gaseous mixture having predetermined properties or characteristics without requiring adjustment of any of the gas burning equiment as an incident to such substitution.

Another object is to provide a special form of calorimetric control of volumetric proportioning of the combustible constituents of a gaseous mixture to insure maintenance of a substantially constant furnace atmosphere as an incident to burning of such mixture.

Another object is to provide novel combinations of elements whereby attainment of the results herein contemplated is facilitated.

Another object is to provide novel methods of and apparatus for utilizing known or ascertained physical and/or chemical characteristics of a plurality of combustible gaseous fluids to insure admixture thereof in the proper volumetric proportions, for the purpose herein set forth.

Other objects and advantages of the invention will hereinafter appear.

The accompanying drawings illustrate certain embodiments of the invention which will now be described, it being understood that the embodiments illustrated are susceptible of modification in respect of certain details of construction thereof without departing from the spirit and scope of my invention as defined in the appended claims.

Figure 1:
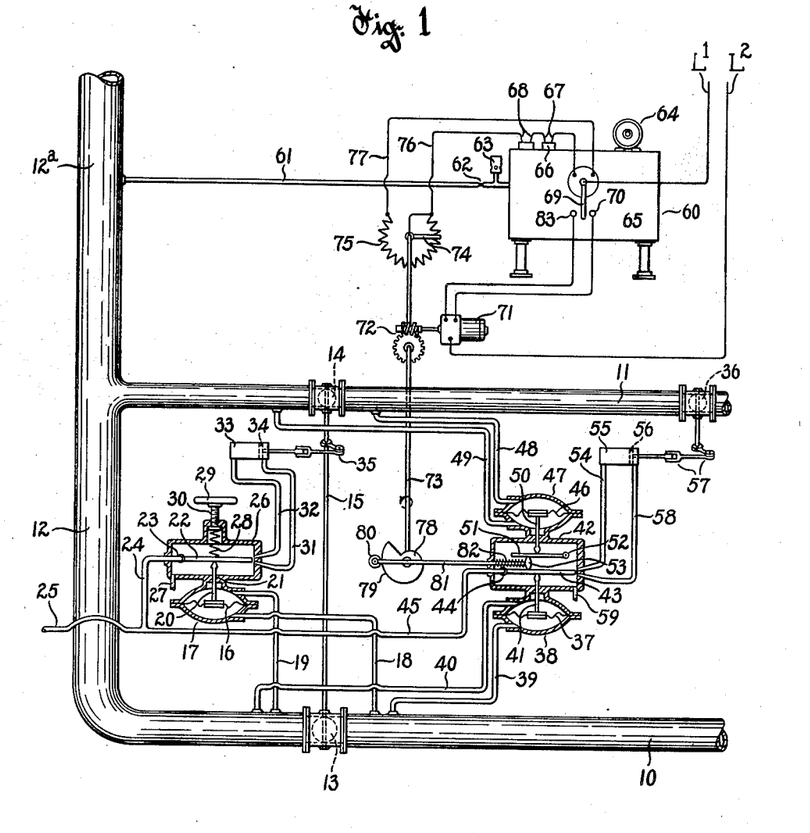
Figure 1 illustrates schematically and diagrammatically one form of gas mixing control system constructed in accordance with my invention.

Referring first to Fig. 1, the numeral 10 designates a conduit through which an undiluted rich gas (say, a paraffin series gas, such as natural gas, or an olefin series gas) flows from a suitable source of supply. Numeral 11 designates a conduit through which air (or other combustible gaseous fluid of substantially constant total heating value per unit (volume) is adapted to flow from a suitable source, such as a pump (not shown). In practice the conduit 11 may be of a size substantially smaller than but preferably definitely proportioned with respect to conduit 10. Conduits 10 and 11 jointly discharge into a relatively larger conduit 12 wherein the undiluted rich gas and air or other diluent are mixed, the resulting gaseous mixture being conveyed by conduit 12 to a suitable point or points of use or storage.

Conduits 10 and 11 are respectively provided with suitable valves, such as the so-called butterfly valves illustrated in dotted lines at 13 and 14. Valves 13 and 14 are rigidly connected with each other, as by means of a rod or shaft 15, whereby said valves are constrained to move simultaneously toward the open or closed positions thereof respectively.

Any suitable means is provided for automatically adjusting valve 13 to maintain a predetermined substantially constant value of the pressure drop thereacross. Such means may be of a character generally similar to that of the device disclosed in Patent No. 1,558,529, granted October 27, 1925, to G. Wünsch. Thus I have shown a flexible diaphragm 16 enclosed within a housing 17, whereby the lower surface of the former is subjected, through pipe 18, to the pressure of the fluid at the upstream side of valve 13; and the upper surface of said diaphragm 16 is subjected, through pipe 19, to the pressure of the fluid at the downstream side of valve 13. A rod or pin 20 is attached to diaphragm 16 and is slidably movable by the latter through a fluid-tight opening or bushing 21 in the upper end wall of housing 17. The upper end of rod 20 is engaged with a nozzle 22 pivoted at 23 to a pipe 24 which communicates with a pipe 25 connected with a suitable source of fluid under pressure.

The fluid supplied through nozzle 22 may comprise air or other gas or a suitable liquid, such as oil. Nozzle 22 is enclosed within a chamber 26, and when a liquid is employed the vent-pipe 27 for chamber 26 is adapted to lead back to the intake of the pump or other source of pressure. When air under pressure is supplied through nozzle 22 pipe 27 may either vent to atmosphere or lead back to the source of pressure. In certain installations pipe 25 may be supplied with fluid under pressure from a suitable source such as the fluid flowing within the aforementioned conduit 12, in which event suitable means, such as a Venturi connection, is provided in conduit 12 for properly venting chamber 26 thereinto through the medium of pipe 27.

Located within chamber 26 is a spring 28 which engages nozzle 22 and biases the latter in opposition to the bias afforded by pin 20 and diaphragm 16. Spring 28 is adjustable manually as by means of a knob or wheel 29 attached to a threaded shaft 30 one end of which forms an abutment for said spring. The degree of adjustment of spring 28 determines the value of the pressure drop to be maintained across valve 13. Thus if the fluid pressure at the upstream side of valve 13 increases (or similarly if the pressure at the downstream side of valve 13 decreases) the diaphragm 16 and pin 20 will move upwardly, with consequent upward tilting of nozzle 22 to a corresponding degree against the bias of spring 28.

Nozzle 22 is shown in the intermediate or neutral position thereof, which position it assumes upon attainment of the desired value of the pressure drop across valve 13; whereas upon the aforementioned upward tilting of nozzle 22 more of the fluid under pressure is supplied to pipe 32 than is supplied to pipe 31. As shown pipe 31 communicates with a cylinder 33 at the right-hand end of a piston 34 located within the latter; and pipe 32 communicates with cylinder 33 at the left-hand end of said piston. Under the conditions aforementioned piston 34 is moved toward the right, and through the medium of the set of levers 35 effects the required degree of opening movement of valve 13 to reduce the value of the pressure drop across valve 13 to the value preselected therefor by the aforementioned adjustment of spring 28. Upon restoration of the preselected pressure drop across valve 13 the aforedescribed parts operate automatically to return nozzle 22 to the intermediate or neutral position thereof illustrated; and in view of the resultant equalization of the fluid pressures on opposite sides of piston 34 the latter will remain in the position to which it was moved.

As aforestated the valve 14 will be moved by shaft 15 in a direction and to a degree corresponding with the direction and degree of movement of valve 13. In order to maintain a preselected proportionality between the value of the pressure drop across valve 14 and the value of the pressure drop across valve 13 I prefer to provide within conduit 11 a second butterfly valve, shown in dotted lines at 36, which is operable automatically in the manner now to be described.

Thus I provide a diaphragm 37 which is located within a housing 38, the lower surface of said diaphragm being subjected, through the medium of pipe 39, to the pressure of fluid at the upstream side of valve 13, and the upper surface of said diaphragm being subjected, through the medium of pipe 40, to the pressure of fluid at the downstream side of valve 13. Attached to diaphragm 37 is a pin 41 which has a fluid-tight slide fit within an opening provide in the upper end wall of housing 38, pin 41 extending into a chamber 42 for engagement with a nozzle 43 pivoted at 44 to a pipe 45 which communicates with the aforementioned pipe 25, whereby fluid under pressure is supplied to said nozzle 43.

I provide another diaphragm 46 which is located within a housing 47. The upper surface of diaphragm 46 is subjected, through the medium of pipe 48, to the pressure of fluid at the upstream side of valve 14, and the lower surface of said diaphragm is subjected, through the medium of pipe 49, to the pressure of fluid at the downstream side of valve 14. Attached to diaphragm 46 is a pin 50 which has a fluid-tight slide fit within an opening provided in the lower end wall of housing 47, pin 50 extending into chamber 42 for engagement with a rod or bar 51 which is pivoted at 52 within said chamber.

Interposed between nozzle 43 and rod 51 is a block 53 which is slidably adjustable with respect to said parts. Here as in the aforementioned Wünsch Patent No. 1,558,529, the position of block 53 is adapted to control the ratio of the controlling effects of the diaphragms 37 and 46 upon the position of nozzle 43, whereby the position of valve 36 may be adjusted automatically to normally maintain a predetermined proportionality between the values of the pressure drops across valves 13 and 14 without requiring any adjustment of the valves 13 and 14.

From the foregoing description it will be understood that valve 13 is operated automatically to maintain a predetermined value of the pressure drop thereacross; whereas valve 14 is moved with valve 13 to simulate the position of the latter without regard to the particular value of the pressure drop across valve 14. The importance of the adjustment of valve 36 for the purpose of maintaining the value of the pressure drop across valve 14 definitely proportional to the value of the pressure drop across valve 13 is therefore apparent. Thus although the valve 13 is operable automatically by the means aforedescribed to maintain a substantially constant value of the pressure drop thereacross, the fact that valve 14 is similarly operated does not necessarily insure maintenance of the pressure drop across valve 14 definitely proportional to the value of the pressure drop across valve 13.

If there is a decrease in the proportional value of the pressure drop across valve 14 with respect to the value of the pressure drop across valve 13 the nozzle 43 will be permitted by diaphragm 46 and pin 50 to move upwardly, under the bias of diaphragm 37 and pin 41, from the neutral position thereof illustrated. Under these conditions a major portion of the fluid under pressure from nozzle 43 will enter pipe 54 which communicates with a cylinder 55 at the left-hand end of a piston 56 located within the latter, thus moving piston 56 toward the right, and acting through the system of levers 57 to effect opening movement of valve 36 to thereby increase the pressure of air at the upstream side of valve 14 until the value of the pressure drop thereacross is again definitely proportional to the value of the pressure drop across valve 13. During movement of piston 56 toward the right the fluid at the right-hand end of cylinder 55 is vented to a corresponding degree through pipe 58 to chamber 42 and thence through vent pipe 59 to atmosphere, or to any other suitable point, as described in connection with pipe 27. While I have herein diagrammatically shown valves 13, 14 and 36 in their extreme open positions, it is to be understood that extreme open or closed positioning of all of said valves seldom occurs in practice.

In the event of an increase in the proportional value of the pressure drop across valve 14 with respect to the value of the pressure drop across valve 13 the nozzle 43 will be permitted by diaphragm 37 and pin 41 to move downwardly, under the bias of diaphragm 46 and pin 50, from the neutral position thereof illustrated. Under these conditions a major portion of the fluid under pressure from nozzle 43 will enter pipe 58, thus moving piston 56 toward the left, and acting through lever system 57 to effect movement of valve 36 toward closed position to thereby decrease the pressure of air at the upstream side of valve 14 until the value of the pressure drop thereacross is again definitely proportional to the value of the pressure drop across valve 13. During movement of piston 56 toward the left the fluid at the left-hand end of cylinder 55 is vented to a corresponding degree through pipe 54 to chamber 42, and thence through pipe 59 to atmosphere or to any other suitable point.

As aforestated, the position of slide block 53 determines the relative proportionality between the values of the pressure drops across valves 14 and 13, and consequently the relative proportionality between the volumetric rate of flow of air through valve 14 and the volumetric rate of flow of rich gas through valve 13. The arrangement is such that slide block 53 is initially adjusted to provide the desired volumetric proportionality between the rates of flow of air and gas when the rich gas flowing through valve 13 is of a known or predetermined quality or total heating value per unit volume.

I provide a calorimetric device, designated in general by the numeral 60, which withdraws through pipe 61 and burns a continuous sample of the mixed gas flowing in portion 12ᵃ of conduit 12. Suitable means are preferably provided for supplying the sample of mixed gas to device 60 at substantially atmospheric pressure; said means comprising an orifice plate shown diagrammatically at 62 and a vent to atmosphere which is preferably in the form of a burner 63. Such a pressure regulating device is shown and described in the Packard Patent No. 1,852,330, dated April 5, 1932, to which reference may be had for a more complete description thereof. The calorimetric device 60 may be of the relatively quick-acting type shown (Fig. 1) and described in detail in my prior Patent No. 2,002,279, dated May 21, 1935, to which reference may be had for a more detailed description thereof.

Thus the device 60 is provided with an electric motor 64 to be supplied with energy from any suitable source, said motor being adapted to drive a pair of pumps (not shown) partially immersed within a body of water or other liquid contained within tank 65, for respectively supplying continuous flows of test gas and combustion air in predetermined proportions to a burner designated in general by the numeral 66. Associated with device 60 is a thermocouple having a hot junction, represented by the leads 67, which is subjected to the effect of the combustion which takes place in burner 66, and a cold junction, represented by the leads 68, which is subjected to the temperature of the body of liquid contained in tank 65, as more fully described in said Patent No. 2,002,279.

I have shown more or less diagrammatically a contactor 69, which is adapted to remain in the intermediate or neutral position thereof illustrated so long as the total heating value per unit volume of the test gas remains at a predetermined or fixed value. Let it be assumed that the calorimetric device operates, in accordance with the disclosure thereof in said Patent No. 2,002,279, upon an increase in the total heating value per unit volume of the test gas (with reference to a value preselected therefor) to effect engagement of contactor 69 with contact 70,— thus completing a circuit for the split-field reversible motor 71 to provide for operation of the latter in one direction; said circuit being obvious. Operation of motor 71 in the direction just mentioned may be assumed to provide (through worm and pinion gearing 72) for rotation of shaft 73 in a counterclockwise direction, as indicated by the curved arrow. Attached to shaft 73 for rotation thereby is a contactor 74 for cooperation with a rheostat resistance 75, which is in turn electrically connected in the thermocouple-controlled milliammeter circuit (represented by conductors 76 and 77). The value of the resistance 75 included in the milliammeter circuit just mentioned is increased by such counterclockwise movement of shaft 73, the result being that the calorimetric device 60 is satisfied with a test gas (from portion 12ᵃ of conduit 12) of a greater total heating value per unit volume than that preselected by the initial setting of the operating parts of device 60.

Shaft 73 also has attached thereto for rotation therewith a cam 78 of predetermined shape, said cam having a surface 79 for cooperation with a roller 80 or the like carried by a rod 81 which carries the aforementioned slide block 53. Rod 81 is slidable with a fluid-tight fit through an opening provided in one end wall of chamber 42, and interposed between the inner surface of said end wall and slide block 53 is a coiled compression spring 82 which biases said block toward the right, wherefore the actual position of slide block 53 is at all times determined by the relative rotary position of cam 78. As will be understood, block 53 is free to move to a limited degree transversely with respect to rod 81. The aforementioned counterclockwise movement of shaft 73 acts through cam 78, roller 80 and rod 81 to effect movement of slide block 53 toward the left, with consequent upward tilting of nozzle 43, to effect movement of piston 56 toward the right to further open valve 36; it having been pointed out that valve 36 is seldom or never required to assume the full open position diagrammatically shown herein. Such opening of valve 36 results in an increase in the volumetric rate of flow of air through conduit 11 into conduit 12, with a consequent greater degree of dilution of the rich gas supplied to conduit 12 through conduit 10.

The aforedescribed movement of slide block 53 thus acts to lower the total heating value per unit volume of the mixture flowing through portion 12a of conduit 12, whereas the simultaneous movement of contactor 74 of rheostat 75 serves to raise the total heating value control point with respect to that at which the calorimetric device 60 was previously or initially set. Consequently the equipment will reach equilibrium, or be stabilized, when the total heating value per unit volume of the mixture in portion 12a of conduit 12 and the new control point of device 60 are identical. By proper design of the equipment whereby a proper relation is maintained between the settings of the flow proportioning valves 13, 14 and 36 and the total heating value control point setting of calorimetric device 60, the equipment will act to insure a composition of the mixture such as to maintain the desired effect of combustion of the mixture, regardless of variations in the quality or composition of the undiluted rich gas supplied through conduit 10.

In the event of a decrease in the total heating value per unit volume of the mixture flowing in portion 12a of conduit 12, as a result of a decrease in the total heating value per unit volume of the undiluted rich gas supplied by conduit 10, the contactor 69 will be moved into engagement with contact 83, thereby completing an alternative circuit for motor 71 to effect operation thereof in a direction which is the reverse of that aforedescribed. Such reverse movement of motor 71 will effect rotation of the shaft 73 in a clockwise direction, cam 78 cooperating with roller 80 to permit movement of rod 81 and slide block 53 toward the right under the influence of spring 82. This will result in a predetermined degree of movement of valve 36 toward closed position, thus reducing the volumetric rate of flow of air through conduit 11, with a consequent reduction in the relative value or ratio of the pressure drop across valve 14 with respect to the pressure drop across valve 13. Due to the fact that a smaller volume of air will be discharged from conduit 11 into conduit 12 the rich gas supplied from conduit 10 will be diluted to a lesser degree, with a consequent increase in the total heating value per unit volume of the mixture flowing in portion 12a of conduit 12.

At the same time contactor 74 will be moved in a clockwise direction to decrease the amount of the resistance 75 included in the aforementioned milliammeter circuit (thus providing a new or different control point), wherefore the calorimetric device 60 will be satisfied with a test gas (from portion 12a of conduit 12) of a lower total heating value per unit volume than that required by the previous setting of the control point of such device. The equipment will therefore reach equilibrium (and the closing movement of valve 36 will be stopped) when the total heating value per unit volume of the mixture in portion 12a of conduit 12 and the new control point of device 60 are identical.

To further explain the operation of my improved gas mixing control system, let it be assumed that the undiluted rich gas supplied by conduit 10 has a total heating value of 1500 B. t. u. per cubic foot, and that the volumetric rate of flow of air from conduit 11 into conduit 12 is such as to provide for the mixture flowing in portion 12a of conduit 12 a total heating value of 820 B. t. u. per cubic foot. If the total heating value of the rich gas supplied by conduit 10 should drop to 1200 B. t. u. per cubic foot, the total heating value of the mixture flowing in portion 12a of conduit 12 would also drop and result in a change in the reading of the calorimetric device 60. Consequently contactor 69 will engage contact 83 to effect operation of motor 71 in a direction to cause clockwise movement of shaft 73, with the aforedescribed resultant movement of slide block 53 toward the right, whereby closing movement of valve 36 is effected. The adjustment of valve 36 to decrease the volumetric rate of flow of air from conduit 11 to conduit 12 necessarily results in an increase in the total heating value of the mixture flowing in portion 12a of conduit 12. Inasmuch as the closing movement of valve 36 is accompanied by a change in the rheostat setting (clockwise movement of contactor 74) to decrease the amount of resistance included in the milliameter circuit, the calorimetric device 60 is affected by two things; namely, an increase in the total heating value per unit volume of the mixture, and an increase in the reading of calorimetric device 60 resulting from the decrease in the value of the resistance 75 included in the control circuit.

The needle of the galvanometer, as represented by contactor 69, will then move to its intermediate or neutral position, or agree with the position of contactor 74 of rheostat 75, when the total heating value of the mixture in portion 12a is at 765 B. t. u. per cubic foot. Similarly other changes in the quality or composition of the rich gas will result in a co-ordinated change in the total heating value per unit volume of the mixture flowing in portion 12a of such character that the flow of the mixture through a fixed pressure head flow control device, such as is employed in gas burning furnaces, will require a substantially constant supply of combustion air to effect complete combustion of the gas at the burners (not shown). Moreover, by use of my improved mixing control device, the rate of potential heat input to the furnace is maintained substantially constant.

Figure 2:
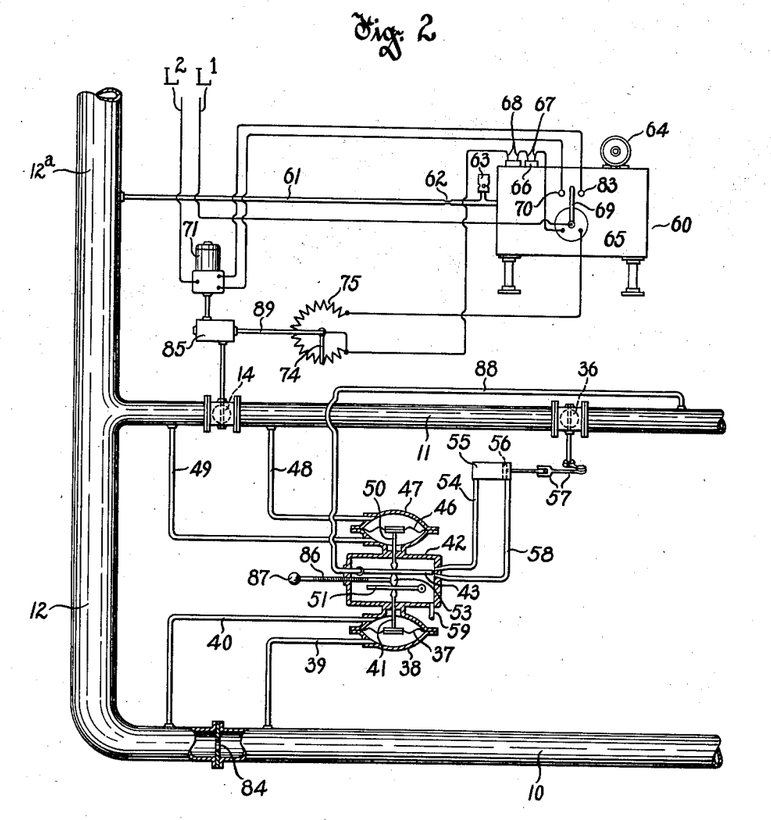
Fig. 2 illustrates schematically and diagrammatically a modified form of gas mixing control system constructed in accordance with my invention.

The modified form of gas mixing control system illustrated schematically and diagrammatically in Fig. 2 is in many respects like that illustrated in Fig. 1, and like parts in the two systems have been designated by like numerals of reference. The system of Fig. 2 is adapted to perform substantially the same functions as the system of Fig. 1, and either system may be employed with approximately the same results in any given installation. The slight differences in the manner of operation of the system of Fig. 2, with respect to the operation of the system of Fig. 1, will be apparent from the following description.

Thus in Fig. 2 the undiluted rich gas is supplied through conduit 10 for discharge thereof into conduit 12, a fixed orifice 84 being provided in conduit 10, on the upstream and downstream sides of which orifice are pipes 39 and 40, respectively, which communicate with housing 38 on the lower and upper sides, respectively, of diaphragm 37. Diaphragm 37 carries pin 41 which is shown as bearing at its free end against rod 51 (instead of against nozzle 43 as shown in Fig. 1).

The conduit 11 is adapted to supply air or other diluent gas which is discharged into conduit 12 for mixture thereof with the rich gas. The valve 14 in conduit 11 is directly connected, through the medium of suitable speed-reducing gearing 85, with the aforementioned split-field reversible motor 71. Motor 71 is likewise connected through gearing 85 with the contactor 74 of the rheostat, the resistance of which is designated by numeral 75. Pipe 48 affords communication between conduit 11 at the upstream side of valve 14 and housing 47 at the upper surface of diaphragm 46; and pipe 49 affords communication between conduit 11 at the downstream side of valve 14 and housing 47 at the lower surface of said diaphragm 46. Diaphragm 46 carries pin 50 the free end of which bears against nozzle 43 (instead of against rod 51 as shown in Fig. 1). Slide block 53 is interposed between nozzle 43 and rod 51, said block being manually adjustable or slidable in either direction, as by means of the rod 86 which has threaded engagement with an opening in one end wall of chamber 42. Rod 86 is preferably provided with a knob 87 to facilitate such adjustment.

Assuming an initial adjustment of valves 14 and 36 and slide block 53 to provide the desired volumetric proportionality between the rates of flow of rich gas and air for mixture thereof within conduit 12 to afford a desired effect of combustion of the mixture, it is to be understood that the settings of the various parts will remain constant pending variation in the relative rates of flow of rich gas or air or a variation in the total heating value per unit volume of the rich gas. It may be noted that in Fig. 2 nozzle 43 is shown as supplied with fluid under pressure by a pipe 88 which communicates with conduit 11 at the upstream side of valve 36, pipe 59 acting to vent chamber 42 to atmosphere or to any other suitable point.

Thus upon an increase in the volumetric rate of flow of the rich gas (resulting from an increase in pressure on the upstream side of orifice 84 or a decrease in pressure on the downstream side of said orifice, or both), the aforedescribed pressure responsive elements, including diaphragms 37 and 46 and nozzle 43 will act, in the manner described in connection with Fig. 1, to effect movement of piston 56 toward the right (the extreme right-hand positioning of said piston as shown diagrammatically in Fig. 2 being seldom if ever required in actual practice) with consequent movement of valve 36 toward full-open position, to correspondingly increase the relative value of the pressure of air or like fluid at the upstream side of valve 14. Upon restoration of the preselected ratio of the value of the pressure drop across valve 14, with respect to the value of the pressure drop across orifice 84, nozzle 43 will be returned automatically to its intermediate position illustrated to stop and retain valve 36 in the position to which it has thus been adjusted.

In the event of a decrease in the volumetric rate of flow of the rich gas the elements aforedescribed operate in an obvious manner to effect movement of valve 36 toward its closed position,—such closing movement of valve 36 being continued pending restoration of the ratio of the values of pressure drops across orifice 84 and valve 14, as preselected by the adjustment of slide-block 53.

In the event of an increase in the total heating value per unit volume of the rich gas flowing through conduit 10 there will be a resultant increase in the total heating value per unit volume of the mixture flowing in portion 12ª of conduit 12. Calorimetric device 60, which withdraws a continuous sample of the mixture through pipe 61, will recognize such increase in total heating value per unit volume of the mixture and cause engagement of contactor 69 with contact 70, thus completing a circuit for the split-field reversible motor 71 for operation thereof in a direction to effect movement of valve 14 toward its full-open position to increase the volumetric rate of flow of air through conduit 11 into conduit 12, with a consequent greater degree of dilution of the rich gas supplied to conduit 12 through conduit 10.

Operation of motor 71 in the direction just mentioned may be assumed to provide for movement of contactor 74 of the rheostat in a counterclockwise direction, through the medium of shaft 89. The value of the resistance 75 of the rheostat included in the milliammeter circuit of calorimetric device 60 is increased by such counterclockwise movement of contactor 74, the result, as aforementioned, being that the calorimetric device 60 is satisfied with a test gas (from portion 12ª of conduit 12) of a greater total heating value per unit volume than that preselected by the initial setting of the operating parts of device 60.

The aforedescribed opening movement of valve 14 thus acts to lower the total heating value per unit volume of the mixture flowing through portion 12ª of conduit 12, whereas the simultaneous movement of contactor 74 serves to raise the total heating value control point with respect to that at which the calorimetric device 60 was previously or initially set. Consequently the equipment will reach equilibrium, or be stablized, when the total heating value per unit volume of the mixture in portion 12ª of conduit 12 and the new control point of device 60 are identical. As stated in connection with the system of Fig. 1, the equipment will act to insure a composition of the mixture such as to maintain the desired effect of combustion of the mixture, regardless of variations in the quality or composition of the undiluted rich gas supplied through conduit 10.

With reference to each of the systems of Figs. 1 and 2, it should be pointed out that the secondary compensation provided in the control device by means of the rheostat, comprising contactor 74 and resistance 75, for changing the total heating value per unit volume of the mixture in accordance with and to compensate for variation in the composition of the rich gas supplied through conduit 10, takes into consideration the following changes in the mixture, namely: (1) specific gravity; (2) quantity of air required per B. t. u. of the gaseous mixture; and (3) the quantity of air contained in such mixture, as well as (4) changes in specific gravity of the rich gas.

The assumed relationships between the total heating value per unit volume, the specific gravity, and the quantity of air required per B. t. u. of the mixture, used in calculating the desired secondary compensation are based upon the average conditions encountered in producing a mixture of air and undiluted rich gas (paraffin and olefin series gases), and are found to be sufficiently accurate in most cases. Thus the rheostat ordinarily employed has a resistance 75 whose total value is 200 ohms. In a given installation it is possible that the rich gas and air proportioning equipment may not be affected directly in accordance with the aforementioned equation, of unity divided by the square root of the specific gravity of the mxture; in which case it may be found desirable to change slightly the amount of secondary compensation provided in the equipment. For this purpose each installation is provided with spare rheostats, preferably of 175 ohms and 225 ohms, respectively, either of which may be substituted for the 200 ohm rheostat comprising contactor 74 and resistance 75.

In actual practice I prefer to install the gas mixing control system with the secondary compensation afforded by the aforementioned 200 ohm rheostat. The relationship between the total heating values per unit volume of the incoming undiluted rich gas (conduit 10) and the mixture (in portion 12$^a$ of conduit 12) will be approximately in accordance with the curve shown at A in Fig. 3. Data is then accumulated on the relationship between the total heating value per unit volume of the rich gas as compared with the total heating value per unit volume of the mixture, and as compared with the furnace atmosphere (effect of combustion of the mixture).

If the collected data show a distinct tendency for the carbon monoxide content of the furnace atmosphere to increase with an increase in the total heating value per unit volume of the rich gas, the rheostat of lower value (175 ohms) is substituted for the 200 ohm rheostat (contactor 74 and resistance 75). The 175 ohm rheostat will afford approximately fifteen per cent less secondary compensation than the 200 ohm rheostat. To provide for a larger degree of secondary compensation than is provided by the 200 ohm rheostat the 225 ohm rheostat may be substituted therefor. However, prior to substituting one of the spare rheostats for the 200 ohm rheostat, care should be exercised to ascertain that the ascertained data aforementioned is sufficiently consistent to indicate a definite divergence; and also to ascertain whether or not the divergence may be caused by a temporary unbalance due to a condition or conditions other than variations in the total heating value per unit volume of the incoming rich gas.

Figure 3:
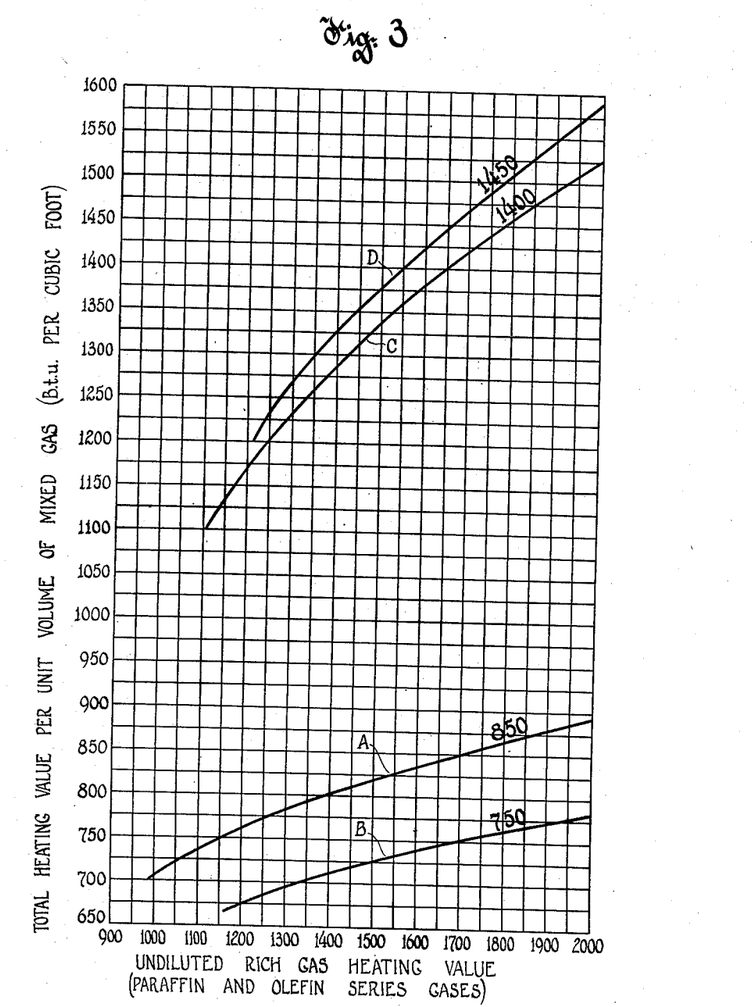
Fig. 3 illustrates graphically the desired relationships between the total heating values per unit volume of a number of undiluted rich gases and the total heating values per unit volume of such gases when mixed with the proper amounts of air.

Referring again to the curve A in Fig. 3, the same illustrates the stabilizing effect of mixing the proper volume of air with the undiluted rich gas to provide a mixture (having a potential heat flow factor of 850 B. t. u. per cubic foot) which is interchangeable with another gas having a potential heat flow factor of 850 B. t. u. per cubic foot; as, for instance, oil gas of 550 B. t. u. per cubic foot, and of .54 specific gravity. This feature of providing for interchangeable or alternative use of one rich gas for another in an industrial gas mixing installation is obviously of great importance from a practical and economic viewpoint,—inasmuch as it provides for switching or changing from one source of rich gas supply to another as occasion requires, without necessitating any change whatsoever in the setting of the various elements of the gas mixing control equipment.

The curve B in Fig. 3 illustrates the proper relationship between the total heating values per unit volume of an undiluted rich gas and the mixture thereof with air, wherein such mixture has a potential heat flow factor of 750 B. t. u. per cubic foot, and is interchangeable with coke oven gas of 530 B. t. u. per cubic foot, and of .39 specific gravity; such coke oven gas when mixed with the proper amount of air likewise providing a mixture having a potential heat flow factor of 750 B. t. u. per cubic foot.

The curve C in Fig. 3 represents a mixture of undiluted rich gas and air having a potential heat flow factor of 1400 B. t. u. per cubic foot; which mixture is interchangeable with natural gas of 1100 B. t. u. per cubic foot. The curve in this instance starts with 1100 B. t. u. natural gas, 1100 B. t. u. mixture, which indicates that no air is added to the natural gas. When the undiluted rich gas has a total heating value of 1800 B. t. u., the total heating value of the mixture will be 1460 B. t. u. (as indicated by curve C).

Curve D in Fig. 3 represents a desirable relationship between the total heating values per unit volume of the undiluted rich gas and of the mixture thereof with air or other diluent; in which particular case there is no necessity for mixing to provide a particular potential heat flow factor. In cases where the undiluted rich gas never goes below 1200 B. t. u., and where it is desirable to reduce to a minimum the amount of air required to be pumped for admixture with the undiluted rich gas, a high potential heat flow factor (such as 1450 B. t. u. per cubic foot provided in accordance with curve D) is desirable. If there is the necessity of providing for substitution of the mixture for some other gas with a fixed potential heat flow factor, the same potential heat flow factor should be selected for such mixture.

While I have herein specifically described my methods and apparatus as applied to the control of mixing of undiluted rich gas (paraffin or olefin series gases) and air; it is to be understood that the methods and apparatus herein described are likewise applicable to the control of mixing of any combustible gas, the physical and/or chemical characteristics of which remain substantially constant, with a combustible gas of varying physical and/or chemical characteristics,—provided that the property or properties of principal importance in the mixed gas can be so coordinated with or related to some physical change in the mixing equipment that the desired effect of combustion of the mixture can be insured.

Also while I have disclosed methods of and apparatus for control of gas mixing as a function of or in accordance with variations in the total heating value per unit volume of the gaseous mixture; it is to be understood that a similar result may be obtained by employment of an auxiliary instrument to measure the value of one of the important properties (such as specific gravity) of the gaseous mixture, and utilizing the determinations of such auxiliary instrument to provide for variation or modification of the setting of the primary mixing control means; provided, of course, that the reading of said auxiliary instrument and the properties of the gaseous mixture are so coordinated with some physical movement of a part or parts of the control mechanism as to provide for attainment of the desired effect of combustion of the gaseous mixture. Moreover, it will be apparent to those skilled in the art that such auxiliary instrument, instead of operating upon the gaseous mixture as just described, may operate upon the incoming constituent flow of gas the physical and/or chemical (combustion) characteristics of which are variable, the physical and/or chemical characteristics of the other constituent flow remaining substantially constant.

The term "physical and chemical properties" included in certain of the claims is to be understood to cover either the physical or chemical properties, or both, referred to.

What I claim as new and desire to secure by Letters Patent is:

1. In gas mixing, the method which comprises effecting a plurality of flows of component combustible gases, uniting said flows to provide a flowing combustible mixture, initially proportioning the flows relatively to each other to provide a predetermined substantially constant total heating value per unit volume of said mixture thereof, and varying the proportionality of said flows, to thereby vary the total heating value per unit volume of said mixture with respect to the aforementioned predetermined value, in accordance with and to compensate for variations in physical and chemical properties of the mixture resulting from variations in physical and chemical properties of the component flows, to thereby insure a predetermined constant effect of combustion of said mixture.

2. In gas mixing, the method which comprises effecting a flow of combustible gas and a flow of air, uniting said flows to provide a flowing combustible mixture, initially proportioning the rates of flow of said combustible gas and said air relatively to each other to provide a predetermined substantially constant total heating value per unit volume of said mixture thereof, and varying the proportionality of said flows relatively to each other, to thereby vary the total heating value per unit volume of said mixture with respect to the aforementioned predetermined value, in accordance with and to compensate for variations in physical and chemical properties of the mixture resulting from variations in physical and chemical properties of the flow of combustible gas first mentioned, to thereby insure a predetermined constant effect a combustion of said mixture.

3. In gas mixing, the method which comprises effecting a flow of combustible gas and a flow of air, uniting said flows to provide a flowing combustible mixture, initially proportioning the rates of flow of said combustible gas and said air relatively to each other to provide a predetermined substantially constant total heating value per unit volume of said mixture thereof, and varying said rate of flow of air relatively to said rate of flow of combustible gas, to thereby vary the total heating value per unit volume of said mixture with respect to the aforementioned predetermined value, in accordance with and to compensate for variations in physical and chemical properties of the mixture resulting from variations in physical and chemical properties of said flow of combustible gas, to thereby insure a predetermined constant effect of combustion of said mixture.

4. The method which comprises mixing a plurality of flows of combustible gaseous fluids, initially proportioning said flows of fluids to provide a composite combustible gaseous fluid flow having a predetermined total heating value per unit volume, at least one of said first mentioned fluids being subject to variation in respect of the quality or total heating value per unit volume thereof, and varying the relative proportionality of said first mentioned fluids in a manner to provide for said composite fluid a flow factor the value of which decreases or increases in accordance with and to compensate for an increase or a decrease, respectively, in the total heating value per unit volume of said composite fluid, said flow factor corresponding to unity divided by the square root of the specific gravity value of said composite fluid.

5. The method of mixing a plurality of flows of combustible gaseous fluids to provide a combustible gaseous mixture, which consists in initially proportioning said flows of fluids to provide a mixture having a predetermined total heating value per unit volume, and then varying the proportionality of said flows of fluids relatively to each other to provide for the mixture a flow factor whose value decreases in accordance with and to compensate for an increase in the total heating value per unit volume of said mixture, said flow factor corresponding to unity divided by the square root of the specific gravity of said mixture, whereby the total heating value per unit volume of said mixture is varied with respect to said predetermined value thereof in a manner to insure a substantially uniform effect of combustion of the mixture.

6. In a gas mixing control system, in combination, means including a conduit for effecting a flow of undiluted rich gas, means including a conduit for effecting a flow of diluent gas initially proportioned with respect to said flow of rich gas, means including a conduit for uniting said flows to provide a combustible gaseous mixture having a predetermined calorific effect per unit volume thereof when burned, and calorimetric means having means associated therewith to so modify the normal response thereof to variations in the total heating value per unit volume of said mixture, as an incident to variations in the total heating value per unit volume of said rich gas, as to vary the proportionality of said flows of rich and diluent gases in a manner to provide for the gaseous mixture a flow factor whose value decreases or increases directly in accordance with and to accurately compensate for an increase or decrease, respectively, in the total heating value per unit volume of said gaseous mixture, said flow factor having a value corresponding to unity divided by the square root of the specific gravity of said gaseous mixture, to thereby insure a substantially constant effect of combustion of said gaseous mixture.

7. In a mixing control system for combustible fluids, in combination, means including conduits for effecting a plurality of flows of constituent combustible fluids, means including a conduit for uniting said flows to provide a combustible fluid mixture, means including restrictions located within said first mentioned conduits for initially proportioning said constituent flows to provide a predetermined total heating value per unit volume of the mixture, primary control means including a calorimeter operable in response to variations in the quality of total heating value per unit volume of at least one of said constituent fluids to effect adjustment of said restrictions to vary the relative proportionality of said flows of fluids and thereby tending to maintain said total heating value per unit volume of the mixture substantially constant, and associated means including an adjustable resistance device operable by said calorimeter in response to and to compensate for variations in the physical and chemical properties of the mixture to definitely vary the effect of said primary control means in such a manner that the normal total heating value per unit volume of the mixture is varied to an extent such as to insure a substantially uniform effect of combustion of the mixture.

8. In a gas mixing control system, in combination, means including conduits for effecting separate flows of combustible gas and air, means including a conduit for uniting said flows to provide a combustible fluid mixture, means including restrictions located within said first mentioned conduits for initially volumetrically proportioning said flows of combustible gas and air to provide a predetermined total heating value per unit volume of the mixture thereof, primary control means including a calorimeter operable in response to variations in the quality or total heating value per unit volume of the mixture thereof, primary control means including a calorimeter operable in response to variations in the quality or total heating value per unit volume of said combustible gas to effect adjustment of certain of said restrictions to thereby vary the relative volumetric proportionality of said combustible gas and air and thereby tending to maintain said total heating value per unit volume of the mixture substantially constant, and associated means including an adjustable resistance device operable by said calorimeter in response to and to compensate for variations in the physical and chemical properties of the mixture to definitely vary the effect of said primary control means in such a manner that the normal total heating value per unit volume of the mixture is varied to such an extent as to insure a substantially uniform effect of combustion of the mixture.

9. In a gas mixing control system, in combination, means including conduits for effecting a plurality of flows of component combustible gases, means including a conduit for uniting said flows to provide a flowing combustible mixture, means including restrictions located within said first mentioned conduits for initially volumetrically proportioning said flows relatively to each other to provide a substantially constant total heating value per unit volume of said mixture thereof, calorimetric means normally operable in response to variations in the total heating value per unit volume of said mixture to effect adjustment of certain of said restrictions to thereby tend to maintain said value substantially constant, and an adjustable resistance device associated with and operable by said calorimetric means and adapted to automatically vary the calibration of the latter in accordance with and to compensate for variations in the physical and chemical properties of the mixture as determined by said calorimetric means, to thereby insure a predetermined effect of combustion of said mixture.

10. In a gas mixing control system, in combination, means including conduits for effecting a flow of combustible gas and a flow of air, means including a conduit for uniting said flows to provide a flowing combustible mixture, means including restrictions located within said first mentioned conduits for initially volumetrically proportioning said flows of gas and air relatively to each other to provide a predetermined substantially constant total heating value per unit volume of said mixture thereof, calorimetric means normally operable in response to variations in the total heating value per unit volume of said mixture to effect adjustment of certain of said restrictions to thereby tend to maintain said value substantially constant, and an adjustable resistance device associated with and operable by said calorimetric means and adapted to automatically vary the calibration of the latter in accordance with and to compensate for variations in the physical and chemical properties of the mixture as determined by said calorimetric means, to thereby insure a predetermined constant calorific effect of combustion of said mixture.

11. In a gas mixing control system for a heat-treating furnace or the like, in combination, means including conduits for effecting a flow of undiluted rich gas, of either the paraffin series or the olefin series, and a flow of air, means including a conduit for uniting said flows of undiluted rich gas and air to provide a flowing combustible mixture, means including restrictions located within said first mentioned conduits for initially volumetrically proportioning said flows of undiluted rich gas and air to provide a predetermined substantially constant total heating value per unit volume of said mixture thereof, calorimetric means normally operable in response to variations in the total heating value per unit volume of said mixture to effect adjustment of certain of said restrictions to thereby tend to maintain said value substantially constant, and an adjustable resistance device associated with and operable by said calorimetric means and adapted to automatically vary the calibration of the latter in accordance with and to compensate for variations in the physical and chemical properties of the mixture as determined by said calorimetric means, to thereby insure a predetermined substantially constant atmosphere in the furnace.

12. In a gas mixing control system, in combination, means including conduits for effecting separate flows of an undiluted rich gas and a gas for diluting the same, means including a conduit for uniting said separate flows to provide a combustible fluid mixture, means including restrictions located within said first mentioned conduits for initially volumetrically proportioning said flows of undiluted rich gas and diluting gas to provide a predetermined total heating value per unit volume of the mixture thereof, primary control means including a calorimeter adapted to burn a continuous volumetrically constant sample of said mixture, said calorimeter being operable in response to variations in the quality or total heating value per unit volume of said mixture for effecting adjustment of said restrictions relatively to each other to vary the relative volumetric proportionality of said flows of undiluted rich gas and diluting gas and thereby tending to maintain said total heating value per unit volume of the mixture substantially constant, and means including an adjustable resistance device associated with and operable by said calorimeter in accordance with variations in the total heating value per unit volume of said mixture to automatically vary the calibration of and controlling effect by said calorimeter upon the relative adjustment of said restrictions, whereby a predetermined substantially constant effect of combustion of said mixture is insured.

13. In a gas mixing control system, in combination, a conduit through which an undiluted rich gas is adapted to flow, a second conduit through which a diluent gas is adapted to flow, a main conduit into which said first and second conduits discharge for effecting mixture of said gases, means including restrictions for initially volumetrically proportioning said flows of rich and diluent gases to provide a mixture of predetermined total heating value per unit volume, fluid pressure means operable automatically in response to variations in the relative rates of flow in said first and second conduits to effect adjustment of said restrictions relatively to each other and thereby tending to maintain said volumetric proportionality substantially constant, calorimetric means for withdrawing and buring a continuous sample of said mixture to ascertain the total heating value per unit volume thereof, said calorimetric means normally tending to operate in response to variation in the total heating value per unit volume of said mixture to effect adjustment of certain of said restrictions to thereby vary the volumetric proportionality of said flows of rich and diluent gases whereby the total heating value per unit volume of said mixture is maintained substantially constant, and means including an adjustable resistance device associated with and operable by said calorimetric means and adapted to modify the controlling effect afforded by the latter whereby the total heating value per unit volume of said mixture is so varied under such conditions as to provide a predetermined substantially constant effect of combustion of said mixture in a furnace or the like.

14. In a gas mixing control system, in combination, a conduit through which an undiluted rich gas is adapted to flow, a second conduit through which a diluent gas is adapted to flow, a main conduit into which said first and second conduits discharge for effecting mixture of said gases, means including restrictions located in said first and second conduits for initially volumetrically proportioning said flows of rich and diluent gases to provide a mixture of predetermined total heating value per unit volume, fluid pressure means operable automatically in response to variations in the relative rates of flow in said first and second conduits to adjust said restrictions relatively to each other and thereby tending to maintain said volumetric proportionality substantially constant, calorimetric means for withdrawing and burning a continuous sample of said mixture to ascertain the total heating value per unit volume thereof, said calorimetric means normally tending to operate in response to variation in the total heating value per unit volume of said mixture to effect adjustment of certain of said restrictions to vary the volumetric proportionality of said flows of rich and diluent gases whereby the total heating value per unit volume of said mixture is maintained substantially constant, and means associated with and subject to control by said calorimetric device and adapted to modify the controlling effect of the latter upon the adjustment of said certain of said restrictions, whereby the total heating value per unit volume of said mixture is so varied under such conditions as to provide a predetermined substantially constant effect of combustion of said mixture in a furnace or the like, said last mentioned means comprising an adjustable rheostat subject to control by said calorimetric device to automatically vary the calibration or setting of the latter.

15. In a gas mixing control system, in combination, a conduit through which an undiluted rich gas is adapted to flow, a second conduit through which a diluent gas is adapted to flow, a main conduit into which said first and second conduits discharge for effecting mixture of said gases, means including restrictions located in said first and second conduits for initially volumetrically proportioning said flows of rich and diluent gases to provide a mixture of predetermined total heating value per unit volume, fluid pressure means operable automatically in response to variation in the relative rates of flow in said first and second conduits to adjust said restrictions relatively to each other and thereby tending to maintain said volumetric proportionality substantially constant, calorimetric means for withdrawing and burning a continuous sample of said mixture to ascertain the total heating value per unit volume thereof, said calorimetric means normally tending to operate in response to variation in the total heating value per unit volume of said mixture to effect adjustment of certain of said restrictions to vary the volumetric proportionality of said flows of rich and diluent gases whereby the total heating value per unit volume of said mixture is maintained substantially constant, and means associated with and subject to control by said calorimetric means and adapted to modify the controlling effect of the latter upon the adjustment of said certain of said restrictions, whereby the total heating value per unit volume of said mixture is so varied under such conditions as to provide a predetermined substantially constant effect of combustion of said mixture in a furnace or the like, said last mentioned means comprising an adjustable resistance device subject to control by said calorimetric means to automatically vary the calibration or setting of the latter, whereby the volumetric proportionality of said rich and diluent gases is so varied under such conditions as to vary the total heating value per unit volume of said mixture to a predetermined extent, whereby a constant effect of combustion of said mixture is insured notwithstanding variations in the total heating value per unit volume of said rich gas.

16. In gas mixing, the method which comprises effecting a plurality of flows of component combustible gases, uniting said flows to provide a flowing combustible mixture, initially and normally controlling the flow of one component gas to maintain a predetermined substantially constant heating value of the mixture, and modifying said normal control to vary the heating value of the mixture with respect to said predetermined value in accordance with and to compensate for variations in the physical and chemical properties of the mixture, to thereby insure a predetermined effect of combustion of said mixture.

17. In gas mixing, the method which comprises effecting a plurality of flows of component combustible gases, uniting said flows to provide a flowing combustible mixture, initially and normally controlling the flow of one component gas to maintain a predetermined substantially constant heating value of the mixture, and modifying said normal control to vary the heating value of the mixture with respect to said predetermined value in accordance with and to compensate for variations in the physical and chemical properties of one component gas of the mixture, to thereby insure a predetermined effect of combustion of said mixture.

18. In a gas mixing control system, in combination, a pair of branch conduits through which an undiluted rich gas and a diluent gas are respectively adapted to flow, a main conduit into which said branch conduits are adapted to discharge to provide a combustible gaseous mixture, a restriction in each of said branch conduits, at least one of said restrictions being adjustable, said restrictions being initially adjusted relatively to each other to provide a predetermined ratio of the pressure drops thereacross, means including a pair of diaphragms the opposite sides of which are respectively subjected to the pressures of said gases at the upstream and downstream sides of said restrictions, whereby said diaphragms are operable in response to variations in the values of said pressure drops, fluid pressure means subject to control by said diaphragms jointly, whereby said fluid pressure means is responsive to the differential value of said pressure drops, a flow controlling valve in one of said branch conduits, means for subjecting said valve to control by said fluid pressure means whereby the ratio of said pressure drops is normally maintained substantially constant, a calorimetric device for withdrawing and burning a continuous sample of said mixture to ascertain the total heating value per unit volume thereof, said calorimetric device normally tending to operate in response to variation in the total heating value per unit volume of said mixture to vary the ratio of the pressure drops across said restrictions whereby the total heating value per unit volume of said mixture is maintained substantially constant, and means including a rheostat adjustable by said calorimetric device and adapted to modify the controlling effect afforded by the latter, whereby the total heating value per unit volume of said mixture is so varied under such conditions as to provide a substantially constant effect of combustion of said mixture in a furnace or the like.

19. In a gas mixing control system, in combination, a branch conduit through which an undiluted rich gas is adapted to flow, a second branch conduit through which air is adapted to flow, a main conduit into which said branch conduits discharge for effecting mixture of said gas and air, a restriction in each of said branch conduits, the restriction in said second branch conduit being adjustable, said last mentioned restriction being initially adjusted to provide a predetermined ratio of the pressure drops across said restrictions, means including a pair of diaphragms respectively subjected to the pressures of said gas and air at the upstream and downstream sides of said restrictions, whereby said diaphragms are operable in response to variations in the value of said pressure drops, fluid pressure means subject to control by said diaphragms jointly, whereby said fluid pressure means is responsive to the differential value of said pressure drops, a flow controlling valve in said second branch conduit, means for subjecting said valve to control by said fluid pressure means whereby the ratio of said pressure drops is normally maintained substantially constant, a calorimetric device for withdrawing and burning a continuous sample of said mixture to ascertain the total heating value per unit volume thereof, said calorimetric device normally tending to operate in response to variation in the total heating value per unit volume of said mixture to vary the ratio of the pressure drops across said restrictions whereby the total heating value per unit volume of said mixture is maintained substantially constant, and means associated with said calorimetric device and adapted to modify the controlling effect afforded thereby, whereby the total heating value per unit volume of said mixture is so varied under such conditions as to provide a substantially constant effect of combustion of said mixture in a furnace or the like, said last mentioned means comprising a rheostat adjustable by said calorimetric device to vary the calibration or setting of the latter, whereby the ratio of the pressure drops across said restrictions is so varied as to vary the total heating value per unit volume of said mixture to a predetermined extent, to thereby insure a constant effect of combustion of said mixture under conditions of variation in the total heating value per unit volume of said mixture.

EDWIN X. SCHMIDT.